UNITED STATES PATENT OFFICE.

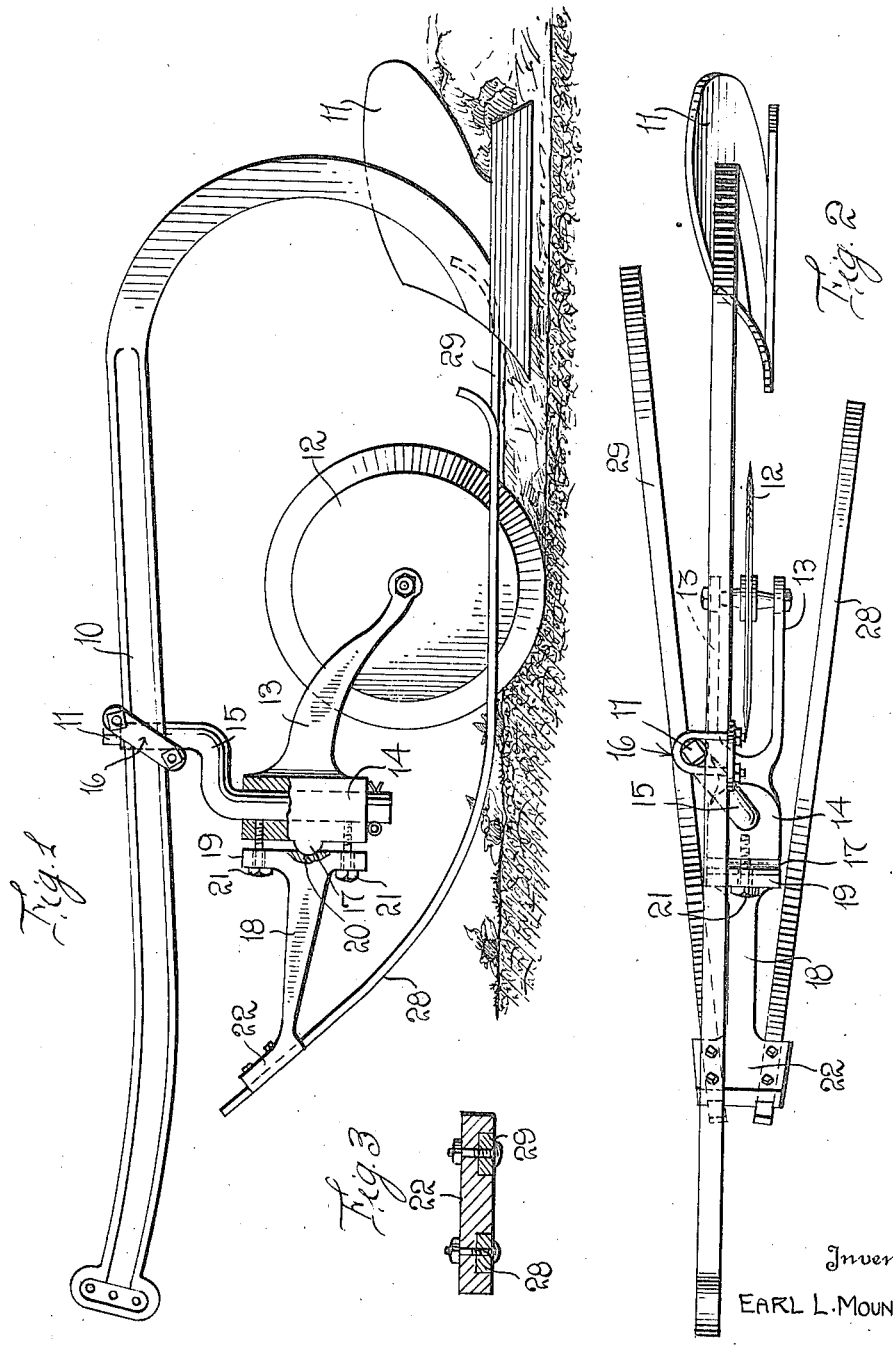

EARL L. MOUNTJOY, OF TABOR, ILLINOIS.

STALK-CUTTING ATTACHMENT FOR PLOWS.

1,261,150.     Specification of Letters Patent.     Patented Apr. 2, 1918.

Application filed March 10, 1917, Serial No. 153,916. Renewed February 16, 1918. Serial No. 217,715.

*To all whom it may concern:*

Be it known that I, EARL L. MOUNTJOY, a citizen of the United States, residing at Tabor, in the county of Dewitt and State of Illinois, have invented certain new and useful Improvements in Stalk-Cutting Attachments for Plows, of which the following is a specification, reference being had to the accompanying drawings.

This invention relates to plows and more particularly to plows having thereon a colter or cutting disk for the purpose of cutting up corn stalks or like stalks as the plow moves across the field.

Plowing under corn stalks for enriching the land is today particularly advocated but a great difficulty is experienced in trying to plow under corn stalks and as a result farmers usually burn the corn stalks and, therefore destroy their best fertilizer.

For the purpose of cutting corn stalks as the land is plowed, the plow is provided with a plain rolling colter, that is a cutting disk mounted in advance of the plow, but this colter wheel ordinarily instead of cutting the stalks as it comes to them, does not ride over or cut through the stalks but pushes the stalks ahead of it so that gradually a dozen or more stalks accumulate in front of the cutting wheel, and then when the pressure becomes great enough so that the stalks can not be pushed farther, the colter rides over them, and such is the support afforded by the corn stalks that a ton plow will be raised completely out of the ground by the colter riding over the stalks. A rolling colter will easily cut its path through the heaviest of corn stalks, if the stalks do not accumulate in bundles but are held down upon the ground. If, however, a bundle of a dozen or more stalks collect in front of the colter, the colter will not cut through the stalks but will ride over the stalks leaving them to collect on the beam of the following plow, causing delay. As a result, the stalks are deposited in piles on the top of the ground and become a hindrance instead of a benefit to the farmer. These stalks are particularly hard to cut if damp.

The object of my invention is to provide means whereby, the stalks may be held down upon the ground while the cutter or colter is passing over them so that the stalks will not move forward in advance of the cutting disk and so that the colter will cut each stalk, one by one, thus preventing the gathering of the stalks in front of the colter and in front of the plow.

A further object of my invention is to provide an attachment for plows including a colter support and resilient rods mounted upon the colter support in advance of the colter and extending downward and rearward on each side of the colter so as to ride over the stalks resiliently, pressing them against the ground and holding them as the colter cuts through them.

A further object is to provide means whereby, the degree of pressure exerted by the resilient rods may be controlled.

Other objects will appear in the course of the following description.

My invention is illustrated in the accompanying drawings, wherein:

Figure 1 is a side elevation of a plow with my attachment applied thereto, the attachment being partly in section;

Fig. 2 is a top plan view of the construction illustrated in Fig. 1;

Fig. 3 is a cross section of the foot 22 of the bracket.

Referring to these drawings, 10 designates the plow beam and 11 a plow of any usual or ordinary construction mounted upon the plow beam. Disposed in front of the plow is a colter or cutting disk 12 having a sharp cutting edge and, mounted in bifurcated arms 13 extending from a body 14. This body has a vertically extending passage for the stem 15. This stem 15 is cranked and the upper end of the stem is formed with a many sided head 11 and this stem is adapted to be attached to the beam of the plow by means of an ordinary clamp 16 as usual.

The colter wheel 12, the forked arms, and body 13 and 14, and the stem 15 have all been used heretofore, but the body 14 differs from the construction ordinarily found in that it is provided upon its forward face with a medially disposed rounded protuberance 17. Disposed against the front face of the body 14 is a bracket 18 having a base 19 formed intermediate its upper and lower ends with a slight concave recess 20 which is adapted to fit against the protuberance 17. Cap screws 21 are disposed in the upper and lower ends of the base 19 and extend into the body 14. The bracket 18 has at its forward extremity the upwardly and forwardly extending widened portion 22 which may be termed the foot of the bracket, this foot upon its outer face being formed with longitudinally extending grooves for engagement with the upper ends of a pair of downwardly and rearwardly extending presser rods 28 and 29. The two rods 28 and 29 are to be made of flat spring steel and are ordinarily about $\frac{3}{16}$ of an inch thick by 1¼ of an inch wide. These rods are resilient and extend downward and rearward so that the rear portions of the rods will lie flat upon the ground. They are held in the depressions or grooves in the foot 27 by means of rivets, or other suitable devices. The illustration shows my device applied to a right hand plow, that is a plow throwing the dirt to the right, and that the right hand presser rod 29 is somewhat longer than the left hand rod 28. The rods are curved upward at their rear ends to allow a reverse movement of the plow when the device is used on tractor drawn plows.

These spring presser rods 28 and 29 exert a constant pressure downward against the surface of the ground and thereby hold the trash, stalks, and any loose object firmly to the ground, while the cutter wheel cuts through the object. The rods hold the stalks down until they are almost turned under by the mold board of the plow and the rod 28 should extend back about 9″ from the mold board.

It will be seen that in actual practice as the plow moves forward, these twin trash rods will ride over the surface of the ground and over the stalks and hold them firmly down, while the cutting disk 12 or colter wheel is cutting the stalks, and the rods continue to exert pressure upon the stalks until the stalks are almost turned under by the action of the plow. The rods may be made to exert a greater or less pressure upon the ground by adjusting the cap screws 21. Thus, for instance, if the lower cap screw is turned inward and the upper cap screw outward, the base 19 will be inclined to the vertical, and a greater pressure will be exerted by the rods. By reversing the position of the screws, a less pressure may be exerted by the rods.

While I have illustrated certain details of construction which I believe to be particularly effective in practice, and which make for cheapness in construction, yet I do not wish to be limited to these details as it is obvious that these may be filled in many ways without departing from the spirit of the invention.

Having described my invention, what I claim is:

1. The combination with a plow beam, of a cutting wheel operatively supported thereon, a resilient rod operatively supported on the beam and having its forward end disposed forward of the cutting wheel, said rod then extending downward and rearward and bearing against the ground, means whereby the cutting wheel may be vertically adjusted, and means for controlling the degree of pressure of the rod upon the ground, independent of the vertical adjustment of the cutting wheel.

2. The combination with a plow beam and a cutting wheel operatively mounted upon the beam, of a resilient rod, the forward end of which is operatively supported upon the beam in advance of the cutting wheel, said rod extending downward and rearward of the cutting wheel, and the rear portion of the rod bearing upon the ground, and means whereby the forward end of the rod may be adjusted in the arc of a circle in a vertical plane, to thereby control the degree of pressure of the rod upon the ground and control the angle of the downwardly and rearward extending portion of the rod with relation to the ground.

3. The combination with a plow beam, of a member operatively engaged with the plow beam and having rearwardly extending arms, a cutting wheel mounted upon said arms, said member having a forwardly extending arm, and a pair of resilient downwardly and rearwardly curved rods mounted upon the forwardly extending arm and extending rearward beyond the cutting wheel on each side thereof.

4. The combination with a plow beam, of a downwardly extending spindle operatively connected to the beam, a member through which said spindle passes and having rearwardly extending arms, a cutting wheel rotatably mounted between said arms, said member having a forwardly extending arm, and a pair of transversely flat resilient rods attached to said forwardly extending rod, said rods extending downward and rearward on each side of the cutting wheel and upwardly turned at their rear ends.

5. The combination with a plow beam, of a cranked spindle attached to the beam and extending downward therefrom, a member through which said spindle passes having rearwardly extending arms, a cutting disk mounted on the member, a supporting bracket mounted upon the face of said member for angular adjustment and having a forwardly extending arm, and a pair of presser rods formed of resilient material attached to the extremity of the bracket and extending downward and rearwardly and then horizontally on each side of the cutting wheel.

6. The combination with a plow beam, of a stem attached to the plow beam, a body through which the stem passes having rearwardly extending arms, a cutting wheel mounted on said arms, the opposite face of the body being formed with a medially disposed rounded protuberance, a forwardly extending bracket having its base formed with a relatively shallow transverse curved seat to receive said protuberance, screws passing through the upper and lower ends of the bracket and into said body, and downwardly and rearwardly extending presser rods mounted upon the extremities of the bracket, said rods being resilient and having their rear portions extending horizontally on each side of the cutting wheel.

7. An attachment for plows comprising a body portion having a stem adapted to be engaged with the plow beam and having rearwardly extending arms, a cutting wheel mounted in said arms, a bracket mounted on and extending forward of the body, and a pair of resilient rods attached to the forward end of the bracket and extending downward and rearward and then horizontally on each side of the cutting wheel.

In testimony whereof I hereunto affix my signature in the presence of two witnesses.

EARL L. MOUNTJOY.

Witnesses:
CALVIN GAMBREL,
ANDREW ROULSTON.